Oct. 29, 1968     T. K. SHERWOOD     3,407,571

HYDROGEN SEPARATION APPARATUS

Filed June 15, 1966

INVENTOR
THOMAS K. SHERWOOD

BY   *Hofgren, Wegner, Allen,*
      *Stellman & McCord*

ATTORNEYS

United States Patent Office 3,407,571
Patented Oct. 29, 1968

3,407,571
HYDROGEN SEPARATION APPARATUS
Thomas K. Sherwood, Concord, Mass., assignor to Whirlpool Corporation, a corporation of Delaware
Filed June 15, 1966, Ser. No. 557,672
2 Claims. (Cl. 55—158)

ABSTRACT OF THE DISCLOSURE

An apparatus for separating hydrogen from a mixture containing the same, the apparatus including a metal wall member of an absorption refrigeration system highly permeable to atomic hydrogen but substantially impermeable to molecular hydrogen and a metal layer on the surface of the wall member facing the hydrogen mixture and capable of dissociating molecular hydrogen into atomic hydrogen and of passing the dissociated hydrogen through the metal layer and thus the metal wall member.

This invention relates to an apparatus for separating hydrogen from a gaseous mixture containing hydrogen.

In certain types of apparatus there are formed undesirable amounts of gases containing hydrogen as in petroleum refining and cracking and in absorption refrigeration systems, particularly those using water as a refrigerant and salt solution as an obsorbent as described, for example, in Patent 2,730,869. As pointed out there, the hydrogen is apparently formed by the salt solution corroding the equipment and even through the amount of corrosion may be small the volume amount of hydrogen formed can be quite large. Undesirable amounts of hydrogen tend to build up even in ordinary absorption refrigeration systems however, such as where ammonia is the refrigerant and water is the absorbent.

Such a high pressure absorption refrigeration system is disclosed in E. P. Whitlow Patent 3,236,064 of February 22, 1966, for example.

One of the features of this invention is to provide an improved apparatus for separating hydrogen from a gaseous mixture containing hydrogen in which a wall member permeable to atomic hydrogen and substantially impermeable to molecular hydrogen is used together with a metal layer or film on the surface of this wall member facing the gaseous mixture with the metal of the layer being capable of dissociating molecular hydrogen into atomic hydrogen, whereupon the atomic hydrogen passes through the wall member while any molecular hydrogen is prevented from passing through and the passed nascent atomic hydrogen immediately recombines to form molecular hydrogen.

Other features and advantages of the invention will be apparent from the following description of certain embodiments of the invention as shown in the accompanying drawings. Of the drawings.

Figure 1:
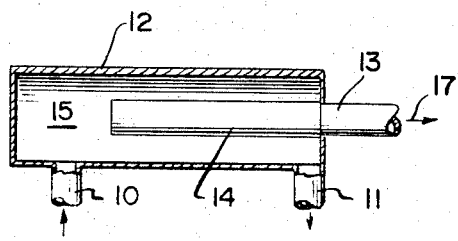
FIGURE 1 is a sectional view through a diffusion cell for separating hydrogen from a mixture of gases containing hydrogen.

It has long been known that certain meals such as palladium and palladium alloys can function as semipermeable membranes which not only pass atomic hydrogen but not molecular hydrogen, but also serve as catalysts for dissociating molecular hydrogen into atomic hydrogen. In the structures of this invention the metal, such as palladium and alloys thereof capable of dissociating molecular hydrogen into atomic hydrogen and passing the atomic hydrogen but not the molecular hydrogen, is arranged as a layer on the surface of a wall member permeable to atomic hydrogen and substantially impermeable to molecular hydrogen. The wall member serves to provide desired strength to the composite wall, but need not consist of a material, such as expensive palladium, which is capable of dissociating hydrogen. Such a wall member is one comprising a metal with a preferred wall member being formed of any of the ordinary steels. In such a combination the metal layer or film is in contact with the gaseous mixture containing hydrogen with the result that the molecules of hydrogen dissociate into atoms, the atoms but not the molecules pass through the layer, and the atoms but not the molecules pass through the wall member and immediately reform as molecules after emerging from the wall member.

The cobination of this invention permits using the metal that causes dissociation of the hydrogen in very thin layers because it is strengthened and supported by the wall member. This is very important not only from an operating standpoint, because the rate of diffusion of the atomic hydrogen is greater the thinner the metal layer, but also from an economic standpoint as such metals are quite expensive. Thus, one of the best metals for this purpose is palladium which is very expensive, or a palladium silver alloy preferably containing a small amount up to about 60% silver with a preferred amount being between 10% and 50% which alloy is less expensive than the pure palladium but yet relatively expensive.

In the apparatus of this invention the actual gas transfer mechanism is not definitely known but the available evidence indicates that the hydrogen molecules dissociate or split into atoms upon contact with the exposed surface of the palladium layer and the resulting atoms move through the palladium or similar layer as ions and electrons. Any other component in the gas is retained behind as the palladium or similar metal layer is impermeable to these other gaseous components as well as to undissociated hydrogen molecules. The atoms which appear still to be in the form of ions and electrons also pass through the wall member such as steel and rejoin as hydrogen molecules upon exiting from the opposite surface of the wall member. This suggested mechanism is not a certainty and the invention here does not depend upon any particular mechanism.

In the apparatus of this invention it is preferred that the metal layer capable of dissociating molecular hydrogen into atomic hydrogen, such as the above stated palladium and alloys thereof, be maintained at an elevated temperature. The elevated temperature also serves to accelerate the diffusion of hydrogen through both the palladium layer and the metal supporting layer. The apparatus will function at ambient temperatures but at a slower rate (when heated the rate is much greater). The preferred temperature for the palladium or similar layer is above 150° F. up to a maximum of about 1500° F. A practical preferred temperature is about 300–500° F. The palladium or similar metal layer or film is preferably about 0.001–0.005 inch thick, as might be formed by vacuum deposition from palladium vapor. Furthermore, the gaseous mixture containing the hydrogen is preferably at an elevated pressure as compared to the opposite side of the apparatus, with the pressure differential being at least 10 p.s.i. and preferably 20–1500 p.s.i. Just as the diffusion and passing of the atomic hydrogen is dependent upon the temperature it is also directly proportional to the pressure differential. The supporting metal wall is preferably thin; in most applications its thickness may be ⅛ inch or less.

Figure 2:
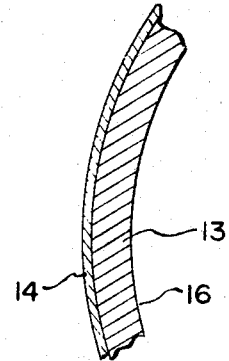
FIGURE 2 is a fragmentary enlarged sectional view through a wall section of the hydrogen diffusing portion of the apparatus with the thicknesses of the wall portions being exaggerated for clarity of illustration.

The figures of the accompanying drawings illustrate technical apparatus embodying the invention. Thus, FIGURE 1 illustrates a diffusion cell into which a gaseous mixture containing hydrogen flows by way of an inlet 10 and from which it flows through an outlet 11. Extending into the main body 12 of the cell is a diffuser tube 13 of metal having on the outer surface thereof a thin layer or film 14 of palladium such as 0.003 inch thick. With such an apparatus, particularly when maintained at elevated temperature and relatively high pressure differential over the ambient atmosphere, the hydrogen of the gaseous mixture on the interior 15 of the cell is dissociated into atomic hydrogen which passes from left to right as shown in FIGURE 2 through the layer 14 and the metal 13 to the interior of the tube 13. After passing through the inner surface 16 of the tube 13 the atomic hydrogen immediately reforms as molecular hydrogen and passes out as indicated by the arrow 17 in FIGURE 1.

Figure 3:
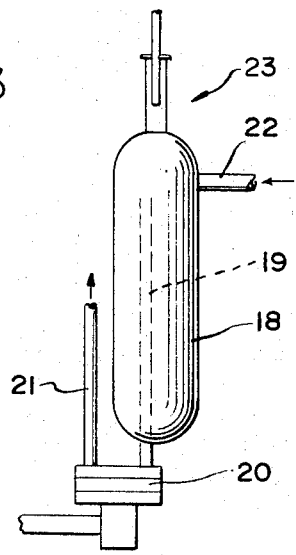
FIGURE 3 is a fragmentary side elevational view of a portion of an absorption refrigeration system using a hydrogen purging cell embodying the invention as a part thereof.

FIGURE 3 illustrates a part of an absorption refrigeration system in which undesirable amounts of hydrogen may accumulate. Thus, in this illustrated portion of the apparatus, there is shown a receiver 18 for liquid rich in absorbed refrigerant having in its interior a cylindrical screen 19 for filtering out foreign particles before the liquid passes into a pump 20 from which the rich liquid flows upwardly in pipe 21 on its ways to the generator (not shown). Rich liquid flowing into the receiver is conveyed thereto through a pipe 22 from the absorber (not shown) of the absorption refrigeration system.

Figure 4:
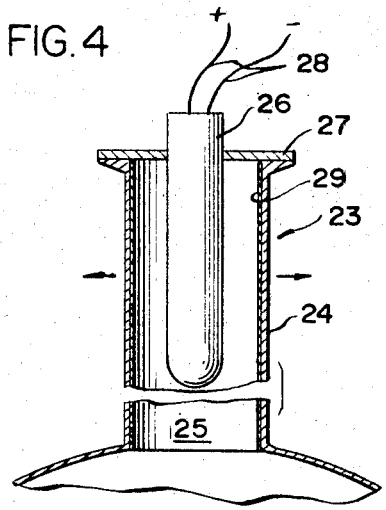
FIGURE 4 is an enlarged detail view of a portion of the apparatus of FIGURE 3.

The hydrogen purging structure generally designated 23 is illustratively disclosed at the top of the receiver 18. As shown in FIGURE 4, the structure 23 may comprise a tubular upward extension 24 of the receiver defining a gas collecting space 25 in which the molecular hydrogen accumulates. A heater 26 is carried on a closure plate 27 to depend coaxially into space 25 for heating the composite wall and the hydrogen gas immediately in contact with it. The heater 26 may be of any conventional construction, illustratively comprising an electric heater having leads 28 connected to a suitable source of electrical energy (not shown). A palladium film 29 is provided on the inner surface of the tubular extension 24 to dissociate the molecular hydrogen and cause it to pass in atomic form through the extension 24 which may be formed of steel for reassociation exteriorly thereof.

Figure 5:
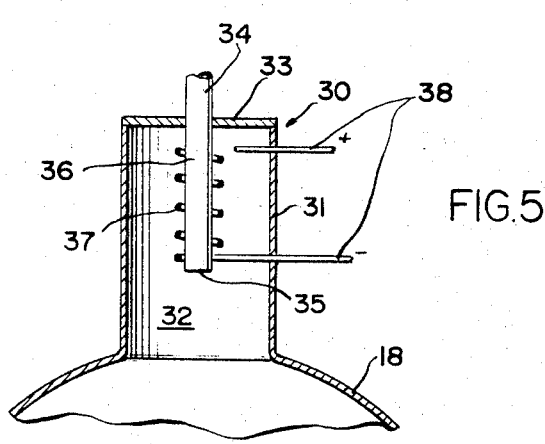
FIGURE 5 is a fragmentary sectional view through an alternate embodiment of an absorption refrigeration system hydrogen purging cell.

Referring now to FIGURE 5, a modified form of hydrogen transfer structure 30 is shown to comprise a tubular extension 31 at the upper end of the receiver 18 defining a collecting space 32 closed at the upper end by a plate 33 through which extends a steel tube 34 having a closed lower end 35 within the space 32. A layer 36 of palladium is provided on the outer surface of the tube 34 in space 32 for dissociating the molecular hydrogen therein and causing it to pass in atomic form into the interior of the tube 34. The temperature of the composite wall consisting of tube 34 and palladium layer 36 may be suitably elevated as by an electric heater coil 37 concentrically surrounding the tube 34 in space 32 and provided with suitable leads 38 for connection to a suitable power supply (not shown).

Thus, in the embodiment of FIGURE 5 the hydrogen transferred from the space 32 into the interior of the tube 34 may be conducted through the tube 34 as desired, for example to a suitable receiver (not shown) wherein the hydrogen may be collected.

Having described my invention as related to the embodiments shown in the accompanying drawings, it is my intention that the invention be not limited by any of the details of description, unless otherwise specified, but rather be construed broadly within its spirit and scope as set out in the accompanying claims.

The embodiments of the invention in which an exclusive property or privilege is claimed are defined as follows:

1. In an apparatus for separating hydrogen from a gaseous mixture containing hydrogen, the combination comprising: a metal wall member in said apparatus highly permeable to atomic hydrogen and substantially impermeable to molecular hydrogen; and a metal layer on the surface of said wall member facing said mixture capable of dissociating molecular hydrogen into atomic hydrogen and of permitting the diffusion of the dissociated hydrogen through said metal layer, said wall member forming part of a fluid vessel in an absorption refrigeration system, and said metal layer being exposed to hydrogen containing impurities in said vessel accumulating in said system.

2. In an apparatus for separating hydrogen from a gaseous mixture containing hydrogen, the combination comprising: a ferrous metal wall member in said apparatus highly permeable to atomic hydrogen and substantially impermeable to molecular hydrogen; and a metal layer comprising palladium on the surface of said wall member facing said mixture capable of dissociating molecular hydrogen into atomic hydrogen and of permitting the diffusion of the dissociated hydrogen through said metal layer, said wall member forming an outer wall part of a fluid vessel in an absorption refrigeration system.

References Cited
UNITED STATES PATENTS

| | | | |
|---|---|---|---|
| 1,174,631 | 3/1916 | Snelling | 55—16 |
| 1,738,720 | 12/1929 | Munters et al. | 55—16 X |
| 2,921,210 | 1/1960 | Schaschl et al. | |
| 3,148,031 | 9/1964 | Vahldieck et al. | 55—16 X |
| 3,208,883 | 9/1965 | Crouthamel et al. | 55—16 X |
| 3,232,026 | 2/1966 | McKinley | 55—16 |
| 3,344,582 | 10/1967 | Merrill et al. | 55—158 X |
| 3,350,846 | 11/1967 | Makrides et al. | 55—158 X |

REUBEN FRIEDMAN, *Primary Examiner.*

J. ADEE, *Assistant Examiner.*